P. C. MELLANTINE.
MOTORCYCLE FORK EXTENSION.
APPLICATION FILED OCT. 13, 1919.
1,365,524.
Patented Jan. 11, 1921.
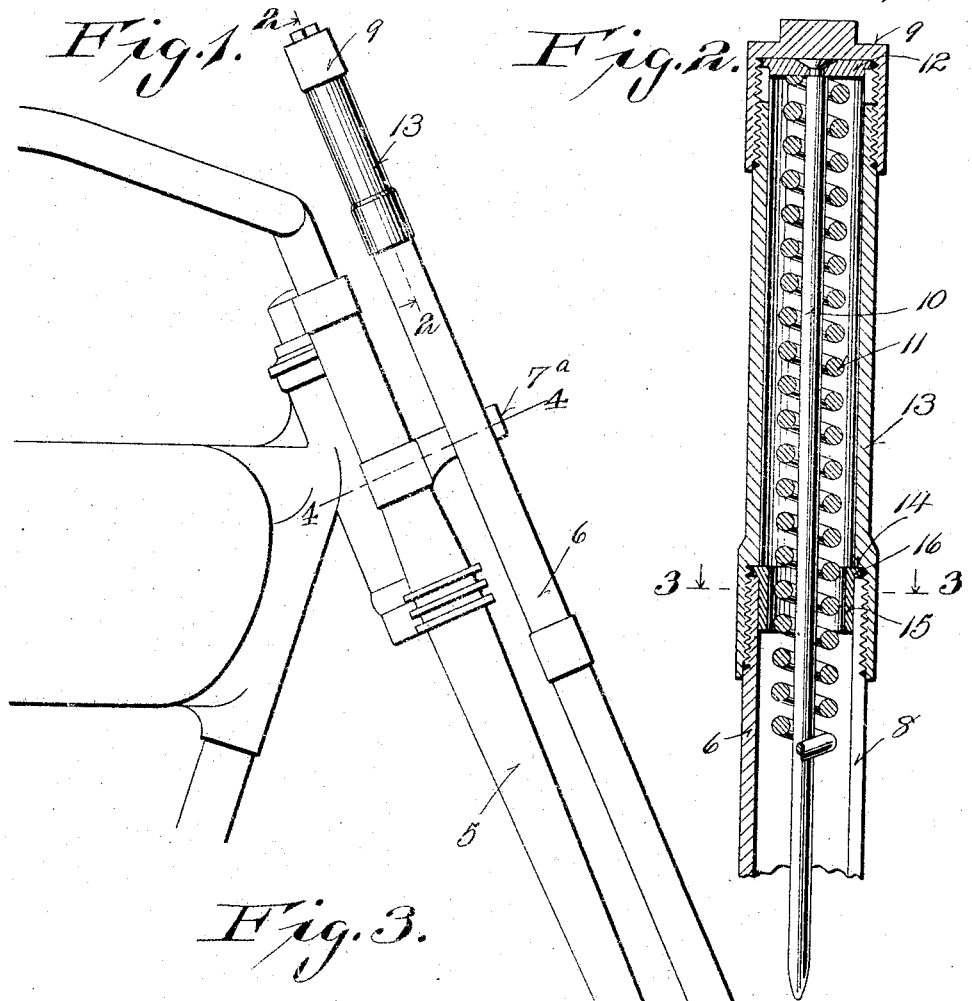
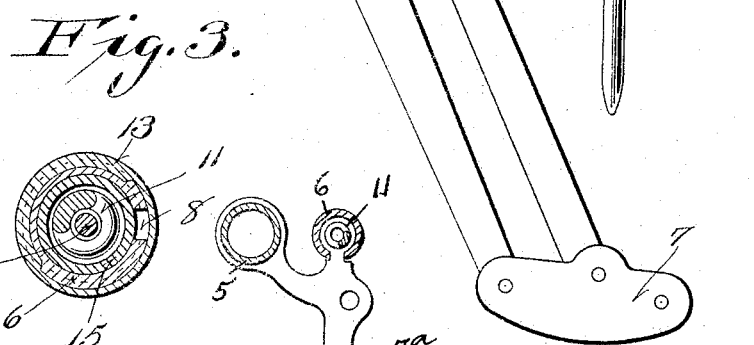
Inventor:
P. C. Mellantine

UNITED STATES PATENT OFFICE.

PAUL C. MELLANTINE, OF MILWAUKEE, WISCONSIN.

MOTORCYCLE FORK EXTENSION.

1,365,524.  Specification of Letters Patent.  Patented Jan. 11, 1921.

Application filed October 13, 1919. Serial No. 330,517.

*To all whom it may concern:*

Be it known that I, PAUL C. MELLANTINE, a citizen of the United States, and resident of Milwaukee, in the county of Milwaukee and State of Wisconsin, have invented certain new and useful Improvements in Motorcycle Fork Extensions; and I do hereby declare that the following is a full, clear, and exact description thereof.

My invention relates to new and useful improvements in the spring fork structures of motorcycles or other vehicles having similar wheel mountings.

Although motorcycle structures when placed on the market are naturally designed to procure a maximum efficiency and comfortable riding qualities within the limitations of this type of vehicle, I have found that an upward extension of the forward spring fork cylinders of the motorcycle, permitting a longer stretch of the upper springs, will procure a marked increase in the riding qualities of the motorcycle by lessening vibration of the handle bars.

It is therefore the object of my invention to provide a device which may be applied as an attachment to the upper ends of the spring fork cylinders of a type of motorcycle now in general use whereby to provide an increased length of the cylinder structure above the usual cross head of the rigid portion of the motorcycle, thus permitting the use of a longer spring.

Inasmuch as the spring fork cylinders are longitudinally slotted throughout their upper portions to receive the cross-head, it is more particularly my object to provide means, operative in conjunction with an extension section threaded on the cylinder, for preventing contraction of the cylinder incidental to sudden severe stress, which would be liable to permit displacement of the extension section by release of the thread connection.

With the above and other objects and advantages in view, which will be apparent as the description proceeds, my invention resides in the novel features of construction, combination and arrangement of parts which will be hereinafter more particularly described and defined by the appended claims.

In the accompanying drawings:

Figure 1 is a side elevational view of the spring fork structure of a motorcycle of well known type, showing my improved fork extension device associated therewith.

Fig. 2 is a longitudinal sectional view through one of the extension cylinder sections and associated structure, the plane of this section being indicated by the line 2—2 of Fig. 1.

Fig. 3 is a transverse sectional view on the line 3—3 of Fig. 2.

Fig. 4 is a transverse sectional view taken on line 4—4 of Fig. 1.

Referring now more particularly to the accompanying drawings, 5 designates the rigid front fork members of a well known type of motorcycle, and 6 designates the spring fork cylinders which are pivoted at their lower ends to the usual spring carrying lever members 7 and which are provided with the longitudinal slots 8 in their inner sides for receiving the cross head 7ª projecting forwardly from the main frame of the motorcycle, springs being disposed in each cylinder 6 above and below the head 7ª, and the slots 8 of the cylinders 6 are extended to the upper ends thereof.

The fork structure also includes a pair of cap members 9 and center rods 10 for the upper cylinder springs 11, these rods having their upper ends secured to disks 12. In the use of my attachment, the caps 9 and disks 12 are employed in positions different from the ordinary relation of parts. In said ordinary relation of parts, the caps 9 are threaded on the upper ends of the cylinder 6 and the disks 12 are disposed within the upper ends of the cylinders and are shouldered to seat thereon.

My improved attachment comprises an extension section 13 for each cylinder 6, the diameter of this section being equal to the diameter of the cylinder and the lower portion of the section is counter-bored and threaded to receive the upper end of the cylinder 6, said counterbore forming an annular shoulder 14 in the section adjacent its lower end. The upper end of the section 13 is threaded to receive the cylinder cap 9, and the rod holding disk 12 is confined between the top of the cap and the upper end of the extension section 13, the upper spring 11 and its rod 10 being increased in length for the use of the attachment.

To prevent accidental contraction of the upper portion of the cylinder 6 by reason of its slot 8, a tubular bushing 15 is fitted snugly in the upper portion of the cylinder 6, the wall of this bushing being of maximum thinness to permit free play of the spring therepast, and the upper end of the bushing is provided with an out-turned flange portion 16 seating on the top of the cylinder 6 and engaged by the shoulder 14 of the extension cylinder section whereby to snugly hold the bushing in place.

An exceedingly simple and efficient arrangement has thus been provided for lengthening the upper portions of the spring fork cylinders of a motorcycle structure, whereby to permit the use of longer spring sections which effect a marked result in relieving jars and stresses imparted to the handle bar and frame structure of the motorcycle.

What is claimed is:

1. An extension structure for a spring fork comprising the combination with a pair of spring fork cylinders and caps primarily adapted to be threaded on the upper ends of said cylinders, of a pair of extension cylinder sections approximately equal in diameter to said fork cylinders, said sections having their lower ends enlarged and counterbored for threaded engagement on the upper ends of the fork cylinders; said extension sections having their upper ends threaded for reception of the caps, spring rod disks disposed between the caps and the upper ends of the extension sections, and spring rods depending from said disks through the extension sections and cylinders.

2. An extension structure for a spring fork comprising the combination with a pair of spring fork cylinders slotted longitudinally to their upper ends, of a pair of extension cylinder sections approximately equal in diameter to said fork cylinders, said sections having their lower portions counterbored to form shoulders therein and to provide for threaded engagement on the upper ends of the fork cylinders, caps threaded on the upper ends of said extension sections, spring rods secured at the upper ends of said extension sections, and bushings snugly fitted within the upper end portions of the spring fork cylinders, said bushings having outwardly extending flange portions on their upper ends engaged between the upper ends of the cylinders and the said shoulders of the extension sections.

In testimony that I claim the foregoing I have hereunto set my hand at Milwaukee, in the county of Milwaukee and State of Wisconsin.

PAUL C. MELLANTINE.